Patented Mar. 17, 1953

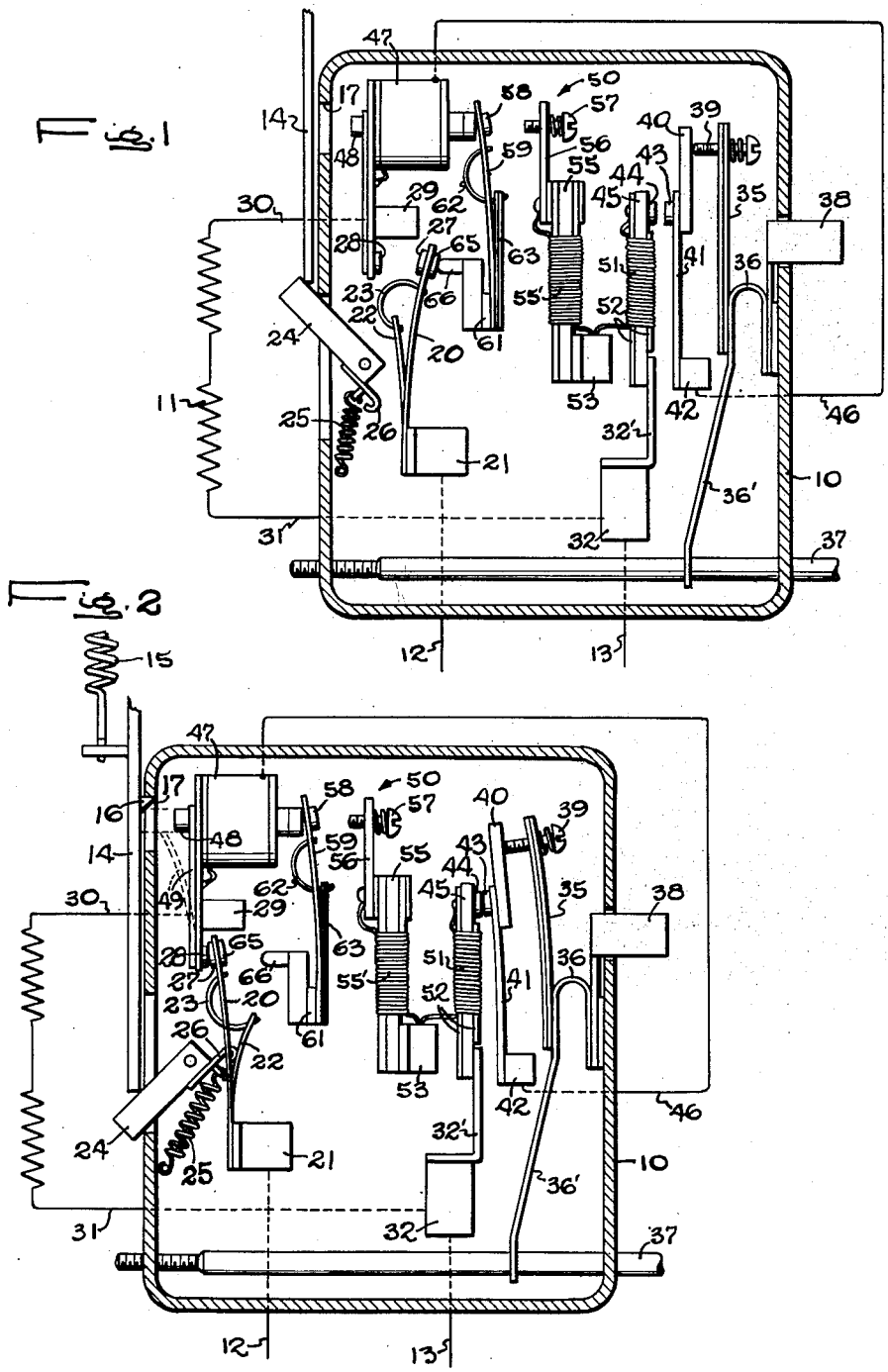

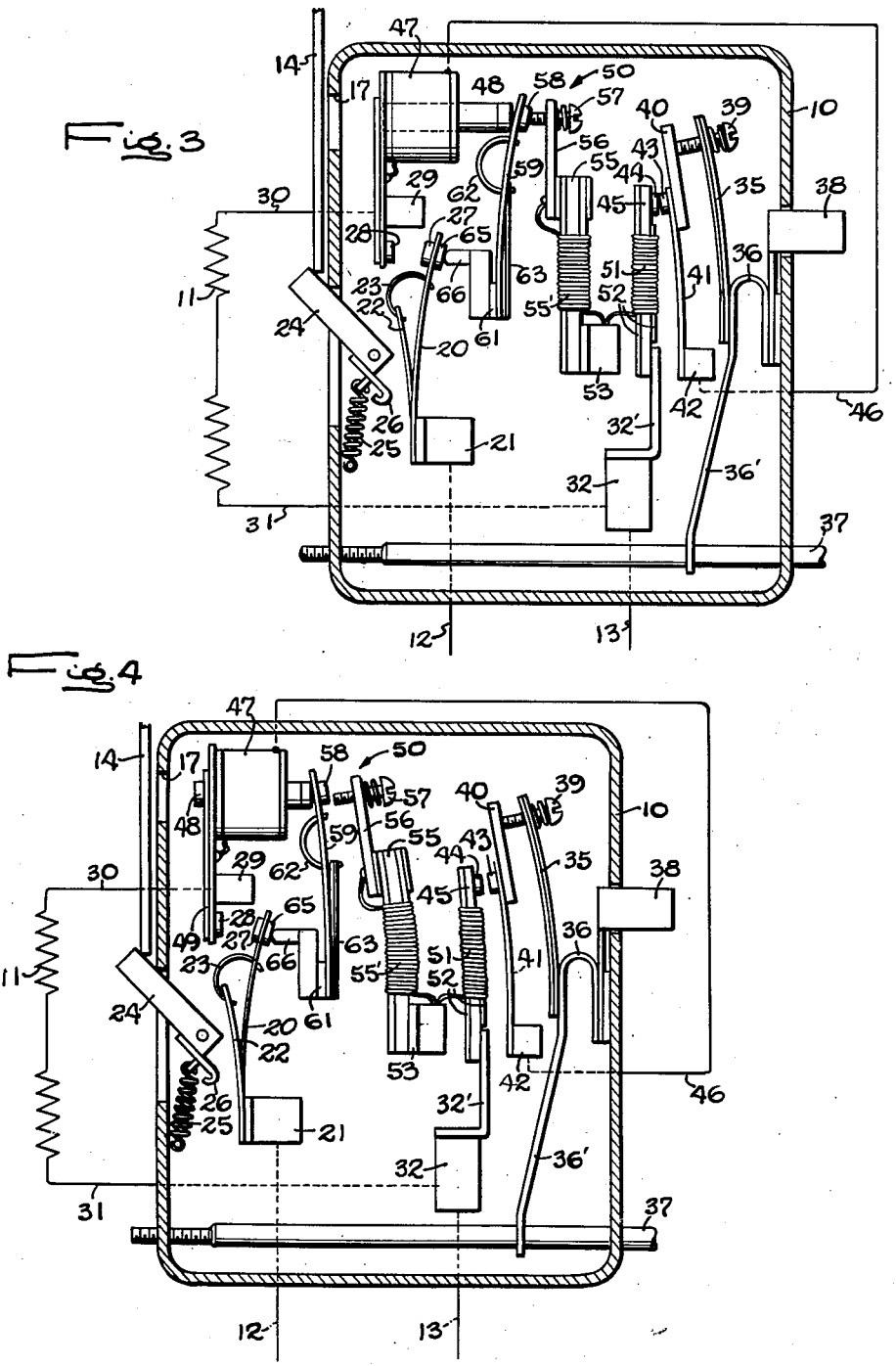

2,632,085

UNITED STATES PATENT OFFICE 2,632,085

CONTROL DEVICE FOR ELECTRICAL APPLIANCES

Joseph E. Brosseau, Oak Park, Ill., assignor to Caroline E. Hoover, Wayne, Ill., and John B. Brosseau, Oak Park, Ill., as trustees Application November 13, 1948, Serial No. 59,922

9 Claims. (Cl. 219—20)

The invention relates generally to control devices for timing and controlling the operation of appliances of the type having a heater or heating chamber, and it is more particularly concerned with an improved control device for use with appliances in which relatively short operating periods or heating cycles follow each other in comparatively rapid succession.

One object of the invention is to provide a control device of the above general character embodying novel means for automatically compensating for changes in the temperature of the appliance and particularly for the gradual increase in temperature as the parts become heated when the appliance is operated a number of times with short idle intervals between successive operations, thereby insuring precise uniformity in the effectiveness of the appliance in each heating cycle.

Another object is to provide a control device having a thermally-responsive timing element in which the timing element and other cooperating elements of the device are organized in a novel manner which permits the timing element to be operated rapidly at closely spaced intervals and which is capable of functioning with a high degree of precision and with substantial uniformity.

Still another object is to provide a thermally-responsive automatically compensated timing device for appliances, which is simple and inexpensive in construction, which can be quickly and easily assembled with an appliance and adjusted to its individual requirements, and which retains its adjustment and its accurate and reliable operating characteristics through long periods of use.

A more specific object is to provide a timing device for appliances in which compensation for changes in the temperature of the appliance is effected by thermally-responsive means and in which the heating of the compensating means is effected during the idle periods of the appliance and precisely controlled in accordance with the condition of the appliance.

Other objects and advantages of the invention will become apparent from the following detailed description of the preferred embodiment illustrated in the accompanying drawings, in which:

Figure 1 is a partially diagrammatic view of a control device embodying the features of the invention, the parts being shown in the positions which they normally occupy when the appliance has been idle for a substantial time.

Fig. 2 is a view similar to Fig. 1, showing the position of the parts near the end of a heating cycle of the appliance.

Fig. 3 is a view similar to the preceding figures, but showing the position of the parts at the end of a heating cycle and the beginning of a compensating cycle.

Fig. 4 is a view similar to the preceding figure, but showing the parts reset for the next heating cycle of the appliance.

While the invention is susceptible of various modifications and alternative constructions, I have shown in the drawings and will herein describe in detail the preferred embodiment, but it is to be understood that I do not thereby intend to limit the invention to the specific form disclosed, but intend to cover all modifications and alternative constructions falling within the spirit and scope of the invention as expressed in the appended claims.

For purposes of illustration the improved control device has been shown in a form particularly suitable for use with electrically-heated appliances, such as toasters. For such use the control device is constructed as a compact unit and enclosed in a casing 10, preferably of sheet metal, adapted to be mounted within or at one end of the toaster housing. The exemplary toaster is equipped with a resistance or heating element 11 which is supplied with electric current through conductors 12 and 13 on a conventional plug-in cord and under control of the device. As is common practice, the heating element 11 is enclosed in a heating chamber into which the bread to be toasted is inserted. It will be understood of course that the appliance may be used for toasting or heating material other than bread and that the term "bread" as herein used is intended to include such other materials.

In the toaster selected to illustrate the invention, the bread to be toasted is carried by a rack of which only a part 14 has been shown. This rack may be of any suitable and well-known construction and is supported for movement vertically into and out of operative relation to the heating element 11 in the heating chamber of the toaster. A spring 15 (Fig. 2) yieldably urges the rack upwardly to a retracted position in which the bread to be toasted may be placed thereon or toasted bread conveniently removed. When the rack is loaded it is pushed down by hand into the heating chamber and during the toasting operation is held in the depressed or operated position by a latch element 16 on the rack part 14 engaging a suitable stationary abutment such as a shoulder formed by an opening 17 in one side wall of the casing 10.

In the present instance the movement of the bread rack to operated position is utilized to initiate a heating cycle of the toaster, and simultaneously to start the operation of the control device. The latter acts after a predetermined timed interval to disengage the latch element 16 and thus release the bread rack for retraction by the spring 15. Such retraction terminates the heating cycle of the toaster and initiates a second operational phase of the control device wherein compensation is effected for the temperature increase in the appliance due to the preceding heating cycle.

The bread rack exercises its controlling action through the medium of a snap or over-center switch having a movable switch member 20, herein shown as an elongated flat spring supported at one end on a bracket 21 mounted on the back wall of the casing 10 and electrically insulated therefrom. The member 20 is slotted longitudinally and transversely to form a resilient tongue 22 having its free end spaced from the overlying portion of the member sufficiently to accommodate an arcuate or C-shaped spring 23. The tongue 22 thus provides a fulcrum for the spring 23 which acts in well-known manner to shift the free end of the spring member 20 in opposite directions with a snap action when the fulcrum is shifted through a central or neutral position in which it occupies a common plane with the point of contact between the spring and the switch member.

In the exemplary device, the tongue 22 is tensioned so that it normally bows to the left, as viewed in the drawings, thus causing the spring 23 to shift the switch member 20 to the right as shown in Fig. 1. Shifting of the switch member to its alternate position is effected by a lever 24 pivotally supported on the casing 10 with its free end positioned in the path of the rack part 14. A spring 25 yieldably urges the lever to a normal or "off" position in which it is shown in Fig. 1, and the downward movement of the rack part 14 swings the lever to the "on" position in which it is shown in Fig. 2. In this movement a finger 26 rigid with the lever acts to cam the tongue 22 to the right until the fulcrum of the spring 23 is shifted past the neutral position. The spring 23 then swings the switch member 20 to its alternate or operated position with a snap action.

The switch member 20 is provided at its free end with a switch contact 27 adapted when the member is in operated position to cooperate with a contact 28 carried by a bracket 29 mounted on and electrically insulated from the casing 10. In the present instance the line conductor 12 is connected to the bracket 21 while the bracket 29 is connected by a conductor 30 with one terminal of the toaster heating element 11. The other terminal of the heating element is connected by a conductor 31 with a bracket 32 which serves as a terminal for the other line conductor 13. It will be apparent therefore that the closure of the switch contacts 27 and 28 completes an energizing circuit for the toaster heating element 11 and thus initiates a heating cycle of the appliance.

The length of the heating cycle is determined by and the cycle is terminated under control of timing means incorporated in the control device. The timing means in its preferred form includes a thermally-responsive main timing element 35, herein shown as an elongated bimetallic strip supported at one end and having its other end free to swing in response to temperature changes. Support for the timing element is provided by a U-shaped bracket 36 having one leg secured to a side wall of the casing 10 and the other extended as at 36' for cooperation with an adjusting shaft 37 threaded into the side wall of the casing. By screwing the shaft in or out the initial position of the supporting bracket and the element 35 may be adjusted to regulate the length of the heating cycle within reasonable limits. Usually, this adjustment is set to provide either light, dark or medium toast in accordance with the desire of the user.

While any suitable means may be utilized for heating the timing element 35, the exemplary control device is arranged to utilize the heat generated by the element 11 for that purpose. Provision is therefore made for effecting appropriate heat transfer from the heating chamber of the toaster to the element. In the present instance the heat transfer is effected by a heat bridge in the form of a metal strip 38 in contact with the bracket 36 and extending from the casing 10 so as to project into the heating chamber of the toaster.

As herein shown, the timing element 35 is arranged so that its free end will swing inwardly (or to the left) when the element is heated and returned toward the position shown in Fig. 1 upon cooling. Adjacent its free end the element carries an adjustable contact element or screw 39 adapted to coact with a strip 40 of insulating material rigid with and projecting from one end of a movable switch member 41. The switch member, which may constitute a resilient flat spring, is supported at one side of the timing element by a bracket 42 mounted on and electrically insulated with the casing 10. The switch member is provided with a switch contact 43 adapted to coact with a switch contact 44 carried by an elongated element 45 hereinafter called the compensating element.

The compensating element 45 may conveniently comprise a bimetallic strip and is mounted on and in electrical contact with an extension 32' of the bracket 32 terminating line conductor 13. The bracket 42 for the switch member 41 is connected by a conductor 46 with one terminal of a solenoid 47 mounted on an extension of the bracket 29 and having its other terminal electrically connected therewith. It will be evident that the closure of the contacts 43 and 44 while the main switch contacts 27 and 28 are closed as previously described will complete an energizing circuit for the solenoid 47.

The solenoid 47 in the exemplary control device constitutes a means whereby the closure of the timer contacts 43 and 44 may effect the release of the latched bread rack and thus terminate a heating cycle of the toaster. For this purpose the solenoid is provided with a plunger 48 which upon energization of the solenoid is projected through the opening 17 in the casing wall against the rack part 14 to disengage the latching element 16 from the casing. A spring 49 carried by the bracket 29 and bearing against a shoulder on the plunger yieldably urges it to a retracted position.

To enable the timing element 35 to be reoperated in another cycle without waiting for it to cool down to room temperature, provision is made for modifying the relative positions of the contacts 43 and 44 in accordance with the temperature of the timing element at the beginning of each heating cycle. More specifically stated, provision is made for shifting the contact 44 progressively farther from the contact 43 (to the left as viewed in the drawings) as the starting temperature of the timing element increases gradually in successive heating cycles. To this end the switch member 45 is constructed in the form of a thermally-responsive element, in this instance a bimetallic strip adapted to warp or swing to the left when heated.

In accordance with the invention, the bimetallic switch member 45 is also utilized to modify the relative positions of the switch contacts 43 and 44 so as to compensate for the gradually increasing temperature of the toaster as the parts become heated in successive operating cycles. In other words, the compensating element is arranged to vary the position of the contact 44 in accordance with two major variables present in the operation of a toaster or other appliance of that general character and thus automatically regulate the length of successive heating cycles so that the heating action will be precisely the same in each cycle irrespective of the intervals between cycles.

The compensating element 45 is enabled to perform the dual function above referred to by reason of the novel arrangement provided for its actuation, whereby an accurately predetermined amount of heat is applied directly to the element immediately following each heating cycle of the toaster. The amount of heat applied to the compensating element is determined by an auxiliary timer 50 which while simple in construction, is accurate and reliable in operation and easily adjusted to conform to the individual requirements of the toaster. This timer is incorporated in the control device in a manner such that the heating of the compensating element is initiated immediately upon termination of the toaster heating cycle and is interrupted automatically after an interval calculated to effect the required positioning of the timer contact 44.

In the preferred form of the control device, the heating of the compensating element 45 is effected by a resistance coil 51 wound directly thereon and electrically insulated therefrom by strips 52 of mica or other suitable insulating material. One terminal of the coil 51 is electrically connected to the element 45 which, as stated heretofore, is mounted on and in electrical contact with the bracket 32 terminating line conductor 13. The other terminal of the heating coil 51 is connected to a bracket 53 mounted on and electrically insulated from the casing 10.

The auxiliary timing device 50 in its preferred form comprises a thermally-responsive element 55, herein shown as a bimetallic strip supported at one end on the bracket 53 and provided with an individual heating coil 55'. An electrically conductive extension strip 56 projecting from the free end of the element is provided with an adjustable contact or screw 57 adapted to coact with a switch contact 58 carried at the free end of an elongated over-center switch member 59. The switch member 59, which may comprise an elongated flat spring, is supported at its other end on a bracket 61 mounted on and electrically insulated from the casing 10. A C-shaped spring 62 interposed between a shoulder on the switch member 59 and the opposed end of a fulcrum member 63 acts to swing the free end of the switch member to either of two positions on opposite sides of a neutral position located in a plane common to the points of engagement of the spring with the switch member and the fulcrum member. The fulcrum member is spaced from the shoulder on the switch member so as to maintain the spring 62 under sufficient tension to retain the switch member at either end of its arc while permitting movement of the member through the neutral position.

In the present instance, the switch member 59 is positioned so that it may be shifted in one direction from the position shown in Fig. 1 through the neutral position and to the position shown in Fig. 3 as an incident to the energization and deenergization of the solenoid 47. As previously explained, the solenoid plunger 48 is returned to retracted position by the spring 49 upon deenergization of the solenoid. This spring is operative to drive the plunger 48 back through the solenoid against the free end of the switch member 59 with sufficient force to shift the switch member through the neutral position. The spring 62 then becomes effective to swing the switch member to its limit position in which the switch contact 58 engages contact screw 57 of the auxiliary timing element.

Closure of the switch contacts 57 and 58 is utilized jointly with the closure of switch contacts 65 and 66 to initiate the heating of the compensating element 45 and to simultaneously start the auxiliary timer 50 in operation. Contact 65 is carried by the main switch member 20 while contact 66 is mounted on and electrically connected to the bracket 61, the contacts being closed upon the opening of the main switch in response to the release of the bread rack. An energizing circuit is thus completed through the contacts 65—66, switch member 59, contacts 58—57, conductive strip 56, heating coil 55', bracket 53 and heating coil 51 to bracket 32. The coil 51 then heats the compensating element 45 which acts to shift the timer contact 44 toward a new starting position in preparation for the succeeding cycle of the toaster.

The auxiliary timer element 55 when heated swings to the left and thereby shifts the overcenter switch member 59 toward and eventually through the neutral position. Spring 62 then becomes effective to swing the switch member to its limit position and separate the contacts 58 and 57. This interrupts the heater circuit above described and leaves the parts in the position shown in Fig. 4 in readiness for the immediate initiation of the next heating cycle of the toaster. The separation of the timer contacts 43 and 44 is such that the main timing element may be reoperated immediately without waiting for it to cool down. The auxiliary timing element 55 of course has sufficient time to cool down substantially to normal starting temperature as it is idle during the heating cycle of the toaster and is heated for only a short interval, as, for example, five seconds immediately following a toasting cycle. If the next toasting cycle is delayed, the compensating element of course cools down gradually, but effectually maintains the timer contacts in the proper relative positions for correctly timing the cycle.

Provision is also made for compensating the auxiliary timer 50 for the gradual increase in the temperature of the toaster. For this purpose the fulcrum member 63 is constructed of bimetallic stock and is mounted so as to respond to heat conducted from the toaster and progressively shift the neutral position of the over-center switch member in accordance with temperature changes of the toaster. The intervals timed by an auxiliary timer are thus automatically lengthened or shortened, as required in the interests of uniform toaster action.

Having in mind the foregoing, the operation of a toaster equipped with the improved control device may be summarized briefly as follows: With the parts of the control device in the positions shown in Fig. 1, the bread to be toasted is placed on the bread rack and the latter is pushed down and latched in operated position to present the bread in operative relation to the heating element 1. Depression and locking of the bread rack closes main switch contacts 27 and 28, thereby completing an energizing circuit for the toaster heating element, as shown in Fig. 2. Heat generated by the element 11 is transferred through the heat bridge 38 to actuate the main timing element 35.

During the toasting cycle the free end of the timing element 35 swings to the left and after the interval for which the toaster has been set, closes switch contacts 43 and 44. Closure of those contacts energizes the solenoid 47, which energizes to release the bread rack and the latter actuates the main switch to open contacts 27—28 and close contacts 65—66. The opening of contacts 27—28 interrupts the circuit for the heating element 11 and also the circuit for the solenoid 47. The plunger 48 of the solenoid is therefore released to the action of its spring 49, which projects the plunger inwardly against the over-center switch member 59 to swing the latter over its neutral position. Spring 62 completes the movement of the over-center switch member to its alternate position, thereby closing contacts 57 and 58 to complete an energizing circuit for the auxiliary timer heating coil 55' and the compensating element heating coil 51. The parts now occupy the position shown in Fig. 3, which represents the beginning of the second operational phase or the compensating cycle of the control device.

As the compensating element 45 heats up, timer contact 44 is shifted progressively farther from the contact 43 so as to establish a sufficient gap therebetween for the next heating cycle. The auxiliary timing element 55 upon heating bends to the left, carrying the over-center switch member 59 with it until the latter passes the neutral position and snaps over to the alternate position in which it is shown in Fig. 4. This interrupts the compensator and auxiliary timer heating circuit and leaves the control device in condition for the next toasting cycle. The cycle may be started immediately or it may be delayed indefinitely. The longer the cycle is delayed, the closer the various elements approach the "cold" position in which they are shown in Fig. 1. Irrespective of the position occupied, however, the succeeding cycle will be timed so that the effectiveness of the toaster heating element 11 will be precisely the same as in the preceding cycle.

The construction of the improved control device as a complete and compact unit facilitates its assembly with a toaster or other appliance. Moreover, the novel compensating arrangement provided therein materially simplifies the work of adjusting the device to the individual requirements of the appliance. Thus, while the heating effectiveness of the elements 11 of different appliances may vary somewhat, the basic interval required for any element to produce a given result may be set initially by appropriate adjustment of the contact screw 39. This setting is retained permanently subject to such further adjustment by means of the manually-operated adjusting shaft 37, as may be desired from time to time.

The rate of temperature increase may also vary in different appliances, thus requiring different degrees of compensation to produce uniform results in successive cycles. The improved control device may be quickly and easily adjusted in conformity with such differences by appropriate manipulation of the adjusting screw 51. It will be evident therefore that the assembly of the control device with the appliance and its initial adjustment for proper operation therewith is extremely simple. The cost of such assembly and adjustment is accordingly reduced to a minimum and at the same time proper functioning of the appliance from the start is insured.

I claim as my invention:

1. In an appliance having a heater adapted to be operated in successive cycles at relatively close intervals, a control device comprising, in combination, means operable manually to initiate a heating cycle of the heater, timing means started in operation simultaneously with the starting of said heating cycle and operative to interrupt the cycle after a timed interval, means for varying the length of said timed interval to compensate for changes in the temperature of the appliance including a thermally-responsive element, a heating element for said thermally-responsive element, means actuated in response to the termination of a heating cycle of the heater for initiating the operation of said heating element, and an auxiliary timing device for interrupting the operation of said heating element after a predetermined interval.

2. In an appliance having a heater adapted to be operated in successive cycles at relatively close intervals, a control device comprising, in combination, means operable manually to initiate a heating cycle of the heater, timing means started in operation simultaneously with the starting of said heating cycle and operative to interrupt the cycle after a timed interval, means for varying the length of said timed interval to compensate for changes in the temperature of the appliance including a thermally-responsive element, an electrically operated heating element for said thermally-responsive element energized immediately upon the termination of said heating cycle, and auxiliary timing means operative to interrupt the energization of said heating element after a predetermined interval.

3. In an appliance having a heater adapted to be operated in successive cycles at relatively short intervals, a control device including means for starting the operation of the heater, timing means started in operation simultaneously with the starting of the heater and operative to terminate its own operation and that of the heater after a predetermined timed interval, thermally-responsive means coacting with said timing means to vary the length of said timed interval so as to compensate for changes in the temperature of the appliance, an electrically-operated heating element associated directly with said thermally-responsive means, circuit connections closed upon the termination of a heating cycle of the heater for energizing said heating element, auxiliary timing means started simultaneously with the termination of the heating cycle of the heater, and switch means in said circuit actuated by said auxiliary timing means for interrupting the operation of said heating element after a predetermined interval.

4. In an appliance having a heating chamber and a heater therein adapted for operation in successive cycles at relatively close intervals, a control device including manually operable means for initiating the operation of said heater to heat said chamber, a thermally-actuated main timing element adapted to respond to the heat in said chamber, switch means actuated by said element when heated to a predetermined temperature for interrupting the operation of the heater, thermally-responsive means for varying the position of said switch means to compensate for the increased temperature of said main timing element in succeeding operating cycles of the appliance, a heater for said thermally-responsive means and a timer for regulating the operation of said last-mentioned heater so as to enable said thermally-responsive means to effect additionally a compensation for the gradual increase in the residual heat of the appliance whereby to insure equal effectiveness of the heating chamber in each successive operating cycle.

5. In a timer for electric appliances, in combination, a normally open main switch adapted to be closed manually and releasably latched in closed position, means for releasing the latched switch comprising a temperature-responsive timing element, a heater energized upon closure of said main switch for applying heat to said element while said switch is closed, a switch contact actuated by said timing element, a second switch contact for cooperation therewith, said latch releasing means becoming operative upon the closure of said switch contacts in response to the heating of said timing element, a temperature-responsive compensating element for modifying the relative positions of said switch contacts, a heater for said compensating element energized substantially simultaneously with the release of the main switch, and auxiliary timing means for interrupting the energization of said compensating element heater after a predetermined interval of operation.

6. In an electric appliance having an electrically operated main heating element to be energized in successive cycles, means for controlling the operation of said heating element including a normally open control switch closable manually and releasably latched in closed position, electrically operated means for releasing the latched control switch, timing means for said switch releasing means including a bimetallic element supported at one end and having its free end swingable in one direction when heated and in the opposite direction upon cooling, said main heating element comprising means for heating said bimetallic element, said element being operative upon the swinging of said free end in said one direction to a predetermined position to initiate the operation of said switch releasing means, a compensating element responsive to temperature changes for varying the position at which the operation of said switch releasing means is initiated by said timing element, a heating coil associated with said compensating element, a circuit for said heating coil closed substantially simultaneously with the operation of said switch releasing means, and auxiliary timing means started in operation concurrently with the closure of said heating coil circuit for interrupting the circuit after a predetermined interval.

7. In an electric appliance having an electrically operated main heating element to be energized in successive cycles, means for controlling the operation of said heating element including a normally open control switch closable manually and releasably latched in closed position, electrically operated means for releasing the latched control switch, timing means for said switch releasing means including a thermally-responsive element having a part moved in one direction when heated and in the opposite direction upon cooling, said main heating element comprising means for heating said thermally-responsive element, said thermally-responsive element being operative upon movement of said part in said one direction to a predetermined position to initiate the operation of said switch releasing means, a compensating element responsive to temperature changes for varying the position at which the operation of said switch releasing means is initiated by said timing element, a heating coil associated with said compensating element, auxiliary timing means for said compensating element including a switch member movable with snap action between two limit positions on opposite sides of a neutral position and operative in one of said positions to close a circuit for said heating coil, said switch member being shifted to said one position concurrently with the operation of said switch releasing means, and means operable a predetermined time after closure of said circuit for shifting said switch member to its other position whereby to interrupt the circuit.

8. In a control device, in combination, three thermally responsive elements, a pair of normally separated switch contacts, one of said elements being operative when heated to move one contact into engagement with the other contact, the second of said elements being operative when heated to move said other contact away from said one contact, an electrical switch associated with the third element adapted when closed to be actuated by the element when heated to a predetermined temperature, electrically operated heating coils associated with said second and third elements, and an operating circuit for said heating coils including said switch contacts and said electrical switch in series relation.

9. In a control device, in combination, three thermally responsive elements, a pair of normally separated switch contacts, one of said elements being operative when heated to move one contact into engagement with the other contact, the second of said elements being operative when heated to move said other contact away from said one contact, switch means including a switch member movable to either side of a neutral position with snap action, a second pair of switch contacts closed with said switch member in one position, said third element being operative when heated to a predetermined temperature to shift said member from said one position through the neutral position and thereby effect the separation of said second pair of switch contacts, electrically operated heating coils associated with said second and said third elements, and an operating circuit for said coils including both of said pairs of switch contacts in series relation.

JOSEPH E. BROSSEAU.

REFERENCES CITED

The following references are of record in the file of this patent:

UNITED STATES PATENTS

| Number | Name | Date |
| --- | --- | --- |
| 1,856,045 | Wight | Apr. 26, 1932 |
| 2,068,374 | Carlson | Jan. 19, 1937 |
| 2,076,774 | Graham | Apr. 13, 1937 |
| 2,085,557 | Uhl | June 29, 1937 |
| 2,320,347 | Brosseau et al. | June 1, 1943 |